United States Patent
Sapoznikov

(10) Patent No.: US 8,902,774 B1
(45) Date of Patent: Dec. 2, 2014

(54) SYSTEM, METHOD, AND COMPUTER PROGRAM FOR DISTRIBUTING TELECOMMUNICATIONS RESOURCES

(75) Inventor: Hanoch Sapoznikov, Kiryat Ono (IL)

(73) Assignee: Amdocs Software Systems Limited, Dublin (IE)

( * ) Notice: Subject to any disclaimer, the term of this patent is extended or adjusted under 35 U.S.C. 154(b) by 288 days.

(21) Appl. No.: 13/433,207

(22) Filed: Mar. 28, 2012

(51) Int. Cl.
*H04W 4/00* (2009.01)

(52) U.S. Cl.
USPC .......................................... 370/252; 370/329

(58) Field of Classification Search
None
See application file for complete search history.

(56) References Cited

U.S. PATENT DOCUMENTS

| | | | |
|---|---|---|---|
| 5,921,865 A | 7/1999 | Scagnelli et al. | |
| 7,035,626 B1 | 4/2006 | Luciano, Jr. | |
| 7,054,629 B2 * | 5/2006 | Turina et al. | 455/432.1 |
| 7,635,304 B2 | 12/2009 | Wright | |
| 7,730,119 B2 * | 6/2010 | Bates et al. | 709/201 |
| 8,036,367 B2 * | 10/2011 | Baluja et al. | 379/221.02 |
| 8,711,721 B2 * | 4/2014 | Smith et al. | 370/252 |
| 2004/0192324 A1 * | 9/2004 | Rudkin | 455/452.2 |
| 2011/0274262 A1 * | 11/2011 | Gamble | 379/102.03 |
| 2013/0084878 A1 * | 4/2013 | Chen et al. | 455/452.1 |

* cited by examiner

*Primary Examiner* — Duc Nguyen
*Assistant Examiner* — Assad Mohammed
(74) *Attorney, Agent, or Firm* — Zilka-Kotab, PC

(57) ABSTRACT

A system, method, and computer program product are provided for distributing telecommunications resources. In use, a plurality of bids is received from a plurality of users, where each of the plurality of bids is associated with telecommunications resources allotted to one of the plurality of users. Additionally, one or more recipients are determined from the plurality of users. Further, at least a portion of the telecommunications resources is distributed to the one or more recipients.

20 Claims, 4 Drawing Sheets

SYSTEM, METHOD, AND COMPUTER PROGRAM FOR DISTRIBUTING TELECOMMUNICATIONS RESOURCES

FIELD OF THE INVENTION

The present invention relates to telecommunications services, and more particularly to distributing telecommunications resources.

BACKGROUND

Telecommunications services are currently used on a daily basis. For example, users may communicate utilizing telecommunications by calling other users, text messaging other users, sending multimedia messages to other users, etc. Unfortunately, conventional methods for implementing telecommunications services have exhibited various limitations.

For example, demand for telecommunications capacity is rising, but revenue is dropping, so simply investing in enlarging a communications network may not provide an optimal solution. Additionally, there is a demand for solutions that may maximize profit and management of telecommunications assets. There is thus a need for addressing these and/or other issues associated with the prior art.

SUMMARY

A system, method, and computer program product are provided for distributing telecommunications resources. In use, a plurality of bids is received from a plurality of users, where each of the plurality of bids is associated with telecommunications resources allotted to one of the plurality of users. Additionally, one or more recipients are determined from the plurality of users. Further, at least a portion of the telecommunications resources is distributed to the one or more recipients.

DETAILED DESCRIPTION

Figure 1:
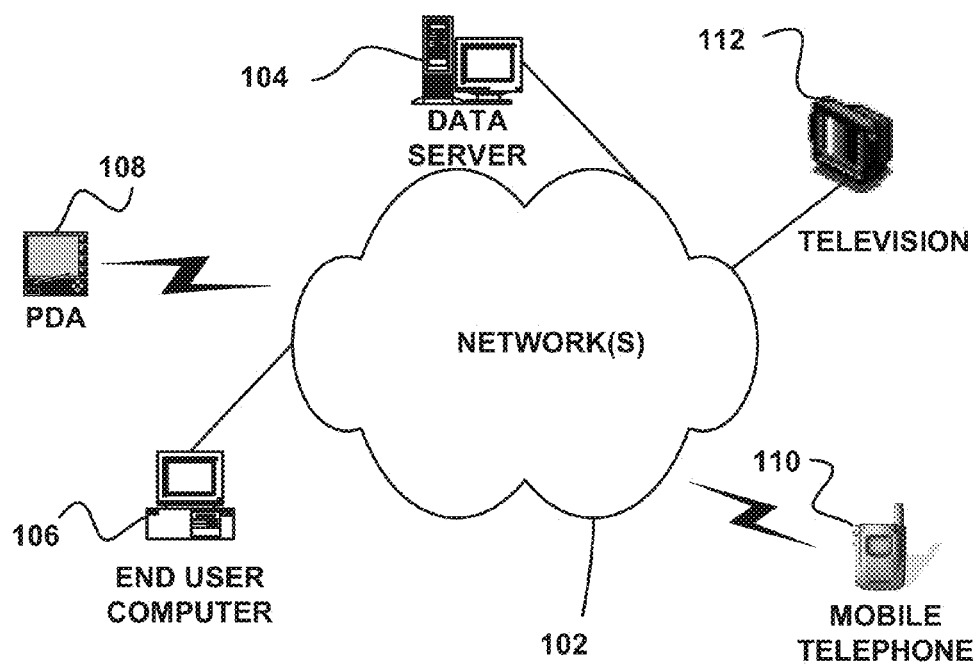
FIG. 1 illustrates a network architecture, in accordance with one possible embodiment.
Figure 1:

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
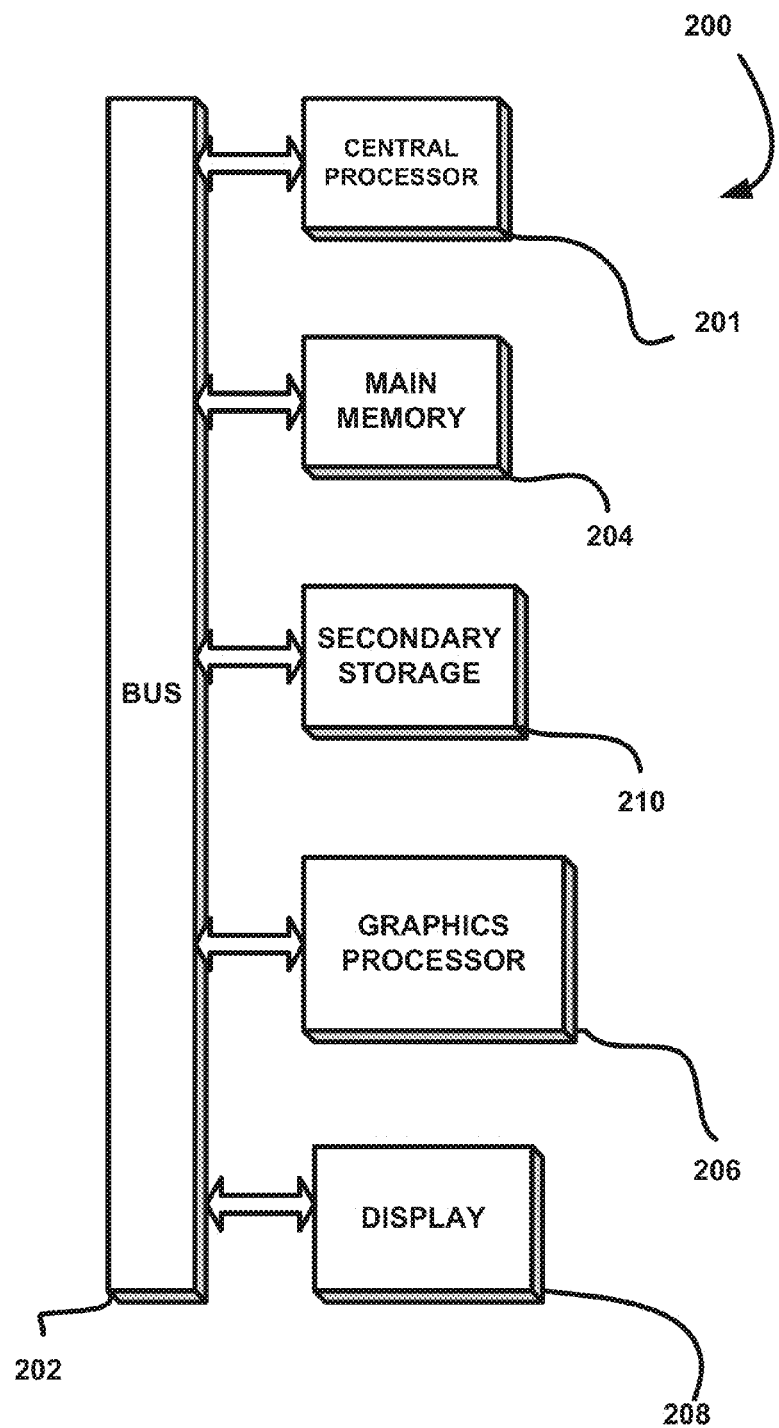
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
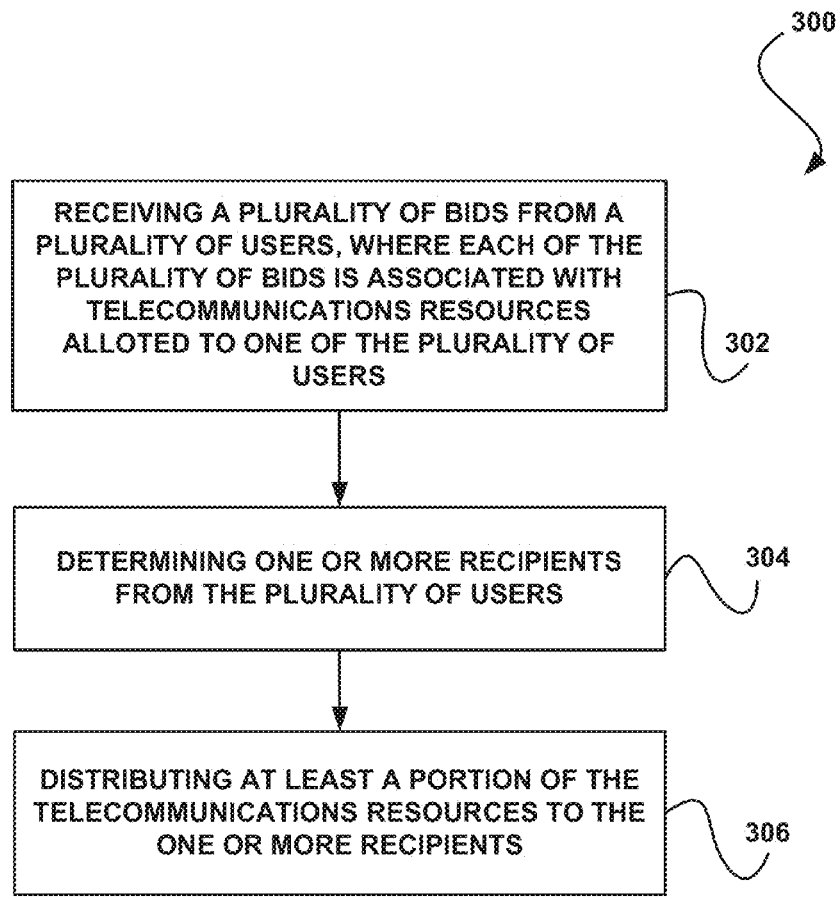
FIG. 3 illustrates a method for distributing telecommunications resources, in accordance with one embodiment.

FIG. 3 illustrates a method 300 for distributing telecommunications resources, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, a plurality of bids is received from a plurality of users, where each of the plurality of bids is associated with telecommunications resources allotted to one of the plurality of users. In one embodiment, the plurality of users may include a plurality of customers of a telecommunications company. For example, each of the plurality of users may subscribe to a telecommunications service provided by the telecommunications resource, may have purchased one or more telecommunications devices provided by the telecommunications resource, etc. In another embodiment, the plurality of bids may be received at a server (e.g., a telecommunications server, etc.).

Additionally, in one embodiment, one or more of the plurality of bids may be submitted utilizing a mobile device. For example, one or more of the plurality of users may submit their bid through a cellular telephone, a cellular enabled device (e.g., a laptop computer, personal digital assistant (PDA), etc.), a wireless device, etc. In another embodiment, one or more of the plurality of bids may be submitted utilizing a non-mobile device. For example, a user may submit a bid using a desktop computer.

In yet another embodiment, a single bid may be received from each of the plurality of users. For example, each of the users may be limited to a single bid. In yet another embodiment, more than one bid may be received from a single user of the plurality of users. In yet another embodiment, the plurality of bids may be submitted by the plurality of users utilizing one or more applications. For example, the plurality of bids may be submitted by the plurality of users utilizing a bidding application purchased by each of the plurality of users from an application vendor.

Further, in one embodiment, each of the plurality of bids may include an agreement to participate in a distribution of the telecommunications resources associated with the bid. For example, a user's bid may include an agreement from the user that the telecommunications resources associated with the bid may be distributed to one or more other users of the plurality of users that have submitted bids. In another embodiment, each of the plurality of bids may include an agreement to forfeit the telecommunications resources associated with the bid. For example, by submitting a bid, a user may agree to forfeit the telecommunications resources associated with that bid.

Further still, in one embodiment, the telecommunications resources associated with each bid and allotted to one of the plurality of users may include telecommunications services purchased by the user that submitted the bid. For example, the telecommunications resources may include one or more of network capacity, network bandwidth, cellular telephone minutes, or any other resource purchased from the telecommunications provider by a user. In another embodiment, the telecommunications resources may be associated with one or more of a time, a date, a duration, etc. For example, each of the plurality of bids may be associated with a day and time during which a user agrees to forfeit telecommunications resources purchased from the telecommunications provider. In another example, by submitting a bid, a user may declare and agree that their provided telecommunications capacity on a particular date and time may be blocked from use of the user for a predetermined duration.

Also, in one embodiment, each of the plurality of bids may include a request for one or more desired telecommunications resources. For example, each of the plurality of bids may include a request for desired telecommunications resources not currently associated with the user (e.g., resources not purchased by the user from the telecommunications provider, resources outside of a telecommunications service plan purchased by the user, etc.). In another example, each of the plurality of bids may include a request for telecommunications resources at a particular time, date, and/or duration. In another embodiment, there may be a limit associated with each bid's request for one or more desired telecommunications resources. For example, each bid's request for one or more desired telecommunications resources may be limited to one or more of a particular time, a particular date, a particular duration, etc.

In addition, as shown in operation 304, one or more recipients are determined from the plurality of users. In one embodiment, the one or more recipients may be determined by randomly selecting the one or more recipients from the plurality of users. For example, the one or more recipients may be determined by holding a lottery in which a predetermined number of recipients are selected from the plurality of users, where such selection is held in a random manner. In another embodiment, the one or more recipients may be determined utilizing one or more algorithms (e.g., one or more probability algorithms, one or more selection algorithms, etc.). In yet another embodiment, the one or more recipients may include one or more users of the plurality of users, and determining the one or more recipients may include selecting the one or more users as the recipients from the plurality of users.

Furthermore, as shown in operation 306, at least a portion of the telecommunications resources is distributed to the one or more recipients. In one embodiment, the telecommunications resources distributed to the one or more recipients may include telecommunications resources requested by the one or more recipients. For example, the bids received from the one or more users determined to be recipients may be analyzed, and a request for desired telecommunications resources included within each of the bids may be identified. In another example, each of the one or more recipients' requests for the desired telecommunications resources may be compared against the telecommunications resources associated with the received plurality of bids, and the desired telecommunications resources may be provided to the one or more recipients if there is a match between the desired telecommunications resources and the telecommunications resources associated with the received plurality of bids.

Further still, in one embodiment, the telecommunications resources distributed to the one or more recipients may be selected arbitrarily. For example, a portion of the telecommunications resources may be selected randomly and may be provided to the one or more recipients. In another embodiment, if a plurality of recipients is determined, an equal amount of the telecommunications resources (e.g., an equal duration, and equal value, etc.) may be distributed to each of the plurality of recipients. In yet another embodiment, additional telecommunications resources other than the telecommunications resources associated with the plurality of bids (e.g., telecommunications resources provided by the telecommunications provider that are not purchased by any of the plurality of users, etc.) may be distributed to the one or more recipients. For example, if there is not a match between the desired telecommunications resources and the telecommunications resources associated with the received plurality of bids, telecommunications resources provided by the telecommunications provider that are not purchased by any of the plurality of users may be provided to supplement the telecommunications resources distributed to the one or more recipients.

In this way, users may voluntarily forfeit allotted telecommunications resources in order to bid for a chance to receive desired telecommunications resources outside of their allotted telecommunications resources. Additionally, users may be assisted in planning their telecommunications resource use by determining which resources to forfeit in order to place a bid. Further, user satisfaction and entertainment may be increased by participating in a lottery to win desired telecommunications resources. Further still, the telecommunications provider may receive additional payments from users purchasing bidding software and may add revenue to their telecommunications network without having to enlarge or alter the telecommunications network.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
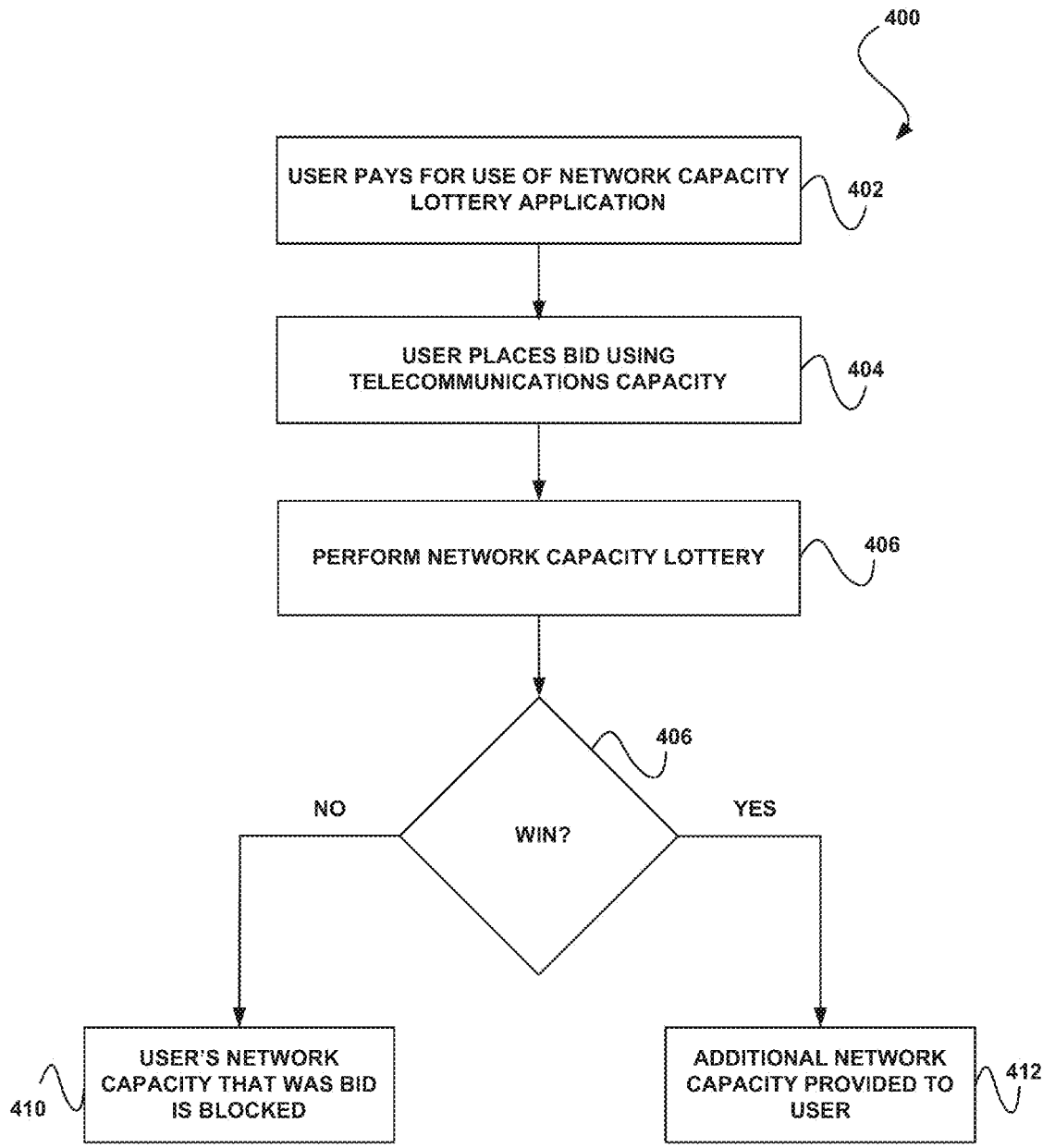
FIG. 4 illustrates a method for executing a network capacity lottery, in accordance with one embodiment.

FIG. 4 illustrates a method 400 for executing a network capacity lottery, in accordance with one embodiment. As an option, the method 400 may be carried out in the context of the details of FIGS. 1-3. Of course, however, the method 400 may be carried out in any desired environment. Further, the aforementioned definitions may equally apply to the description below.

As shown in operation 402, a user pays for use of a network capacity lottery application. In one embodiment, the network capacity lottery application may include software purchased utilizing a mobile telecommunications device and run on the mobile telecommunications device. For example, the network capacity lottery application may be purchased from an application vendor accessed via the mobile telecommunications device. In another embodiment, the network capacity lottery application may be accessed, purchased, and downloaded from a web page utilizing an interface (e.g., a web browser, etc.). In yet another embodiment, the network capacity lottery application may be purchased utilizing a non-mobile telecommunications device (e.g., a desktop computer, etc.) and run on the mobile telecommunications device.

Additionally, in one embodiment, the network capacity lottery application may be offered by a telecommunications provider. For example, the network capacity lottery application may be available on a web page of the telecommunications provider.

In another embodiment, the user who pays for use of the network capacity lottery application may include a customer of the telecommunications provider. For example, the user may subscribe to a telecommunications service plan (e.g., a cellular telephone service plan, a wireless hot spot plan, a voice over IP (VOIP) plan, etc.).

Further, as shown in operation 404, using the network capacity lottery application, the user places a bid using their telecommunications capacity at a specific date, time, and duration, and requests desired telecommunications capacity at a specific date, time, and duration. In one embodiment, the telecommunications capacity that is bid by the user may include telecommunications services purchased by the user. For example, the telecommunications capacity that is bid by the user may include telecommunications services provided according to a contract between the user and the telecommunications provider.

Further still, in one embodiment, the desired telecommunications capacity that is requested by the user may include telecommunications services not purchased by the user. For example, the desired telecommunications capacity that is requested by the user may include telecommunications services that are provided by the telecommunications provider but are not available to the user through a contract between the user and the telecommunications provider. In another embodiment, the user may place their bid of telecommunications capacity and may request their desired telecommunications capacity utilizing an interface of the network capacity lottery application. In yet another embodiment, the user may place a bid using their telecommunications capacity by selecting a predetermined date, time, and duration to bid that is displayed by the network capacity lottery application, and may select a predetermined date, time, and duration of desired telecommunications capacity that is displayed by the network capacity lottery application.

Also, as shown in operation 406, a network capacity lottery is performed. In one embodiment, the network capacity lottery may be performed by the telecommunications provider. In another embodiment, the network capacity lottery may be performed by an entity associated with the telecommunications provider (e.g., a lottery entity, etc.). In yet another embodiment, the network capacity lottery may be performed utilizing one or more algorithms (e.g., randomizing algorithms, selection algorithms, etc.). Of course, however, the network capacity lottery may be performed in any manner.

In addition, in one embodiment, a single winner may be determined as a result of the network capacity lottery. In another embodiment, multiple winners may be determined as a result of the network capacity lottery. Furthermore, as shown in decision 408, it is determined whether the user is one of the winners of the network capacity lottery. If it is determined in decision 408 that the user is not one of the winners of the network capacity lottery, then in operation 410 the user's network capacity that was bid is blocked. In one embodiment, the user's network capacity may be blocked for the specific date, time, and duration noted in the telecommunications capacity that is bid by the user.

Further still, in another embodiment, blocking the user's network capacity may include preventing the user from performing one or more actions associated with purchased telecommunications services purchased by the user. For example, the user may be prevented from making cellular telephone calls, sending text messages, downloading or uploading data, using more than a predetermined telecommunications bandwidth, lowering a user's telecommunications bandwidth, etc. Of course, however, the user's network capacity may be blocked in any manner.

Also, if it is determined in decision 408 that the user is one of the winners of the network capacity lottery, then in operation 412 additional network capacity is provided to the user. In one embodiment, providing additional network capacity to the user may include expanding the user's network capacity to include the desired telecommunications capacity that is requested by the user (e.g., for the specific date, time, and duration requested by the user in the user's bid, etc.). In another embodiment, the user's network capacity may still be blocked for the specific date, time, and duration noted in the purchased telecommunications capacity that is bid by the user.

Additionally, in one embodiment, the additional network capacity provided to the user may include network capacity (e.g., telecommunications services, etc.) that were provided (e.g., bid, etc.) by other users participating in the network capacity lottery. For example, a user who participated in the network capacity lottery and that is a winner of the network capacity lottery may be provided desired resources requested by the winner, where such resources are bid by a user who participated in the network capacity lottery but is not a winner of the network capacity lottery, and therefore had those bid resources blocked.

In this way, customers of a telecommunications provider may declare that they wish to be temporarily blocked from one or more telecommunications resources for a predetermined, date, time, and duration in order to possibly gain desired telecommunications resources for another predetermined, date, time, and duration. Additionally, the telecommunications provider may obtain additional revenue from the sale of the network capacity lottery application. Further, participation in the network capacity lottery may control and flatten network capacity consumption.

Further, users may be enabled to obligate that they will not use network capacity at a particular date, time, and duration. Further still, all or part of this network capacity volunteered by the users may be provided to winners of the lottery so that such winners may be able to consume more network capacity than was available to them in a network capacity plan purchased from the telecommunications provider. Also, by volunteering network capacity at a particular date, time, and duration, the users be assisted in planning their network use, and the users may have increased satisfaction in that the users may bid on the network capacity lottery using network capacity that was undesirable to the particular user in order to win desired network capacity. Additionally, the telecommunications provider may be able to add revenue to their network without investing in enlarging their network, and may reduce network consumption while better controlling demands of the network.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program embodied on a non-transitory computer readable medium, comprising:
   computer code for receiving a plurality of bids from a plurality of users, where each of the plurality of bids is associated with telecommunications resources allotted to one of the plurality of users, the plurality of bids including:
      a first bid from a first user, wherein the first bid includes first telecommunications resources allotted to the first user, and
      a second bid from a second user, wherein the second bid includes second telecommunications resources allotted to the second user;
   computer code for determining one or more recipients from the plurality of users, including determining that the first user is included in the one or more recipients; and
   computer code for, in response to determining that the first user is included in the one or more recipients, distributing at least a portion of the telecommunications resources to the first user;
   wherein the computer program is operable such that when the second user is not included in the one or more recipients:
      the second user is prevented from performing one or more actions associated with the second telecommunications resources allotted to the second user and included in the second bid received from the second user, and
      at least a portion of the second telecommunications resources previously allotted to the second user, and included in the second bid received from the second user, is included in the at least a portion of the telecommunications resources distributed to the first user.

2. The computer program of claim 1, wherein the plurality of users include a plurality of customers of a telecommunications company.

3. The computer program of claim 1, wherein one or more of the plurality of bids are submitted utilizing a mobile device.

4. The computer program of claim 1, wherein the plurality of bids are submitted by the plurality of users utilizing a bidding application purchased by each of the plurality of users from an application vendor.

5. The computer program of claim 1, wherein each of the plurality of bids includes an agreement to participate in a distribution of the telecommunications resources associated with the bid.

6. The computer program of claim 1, wherein each of the plurality of bids includes an agreement to forfeit the telecommunications resources associated with the bid.

7. The computer program of claim 1, wherein the second telecommunications resources included in the second bid from the second user and allotted to the second user includes telecommunications services purchased by the second user.

8. The computer program of claim 1, wherein the telecommunications resources include one or more of network capacity, network bandwidth, and cellular telephone minutes.

9. The computer program of claim 1, wherein the telecommunications resources are associated with one or more of a time, a date, and a duration.

10. The computer program of claim 1, wherein each of the plurality of bids includes a request for one or more desired telecommunications resources.

11. The computer program of claim 1, wherein each of the plurality of bids include a request for desired telecommunications resources not purchased by the user from a telecommunications provider.

12. The computer program of claim 1, wherein the one or more recipients are determined by randomly selecting the one or more recipients from the plurality of users.

13. The computer program of claim 12, wherein the one or more recipients may be determined by holding a lottery in which a predetermined number of recipients are selected from the plurality of users, where such selection is held in a random manner.

14. The computer program of claim 1, wherein the telecommunications resources distributed to the one or more recipients include telecommunications resources requested by the one or more recipients.

15. The computer program of claim 10, wherein each of the one or more recipients' requests for the desired telecommunications resources is compared against the telecommunications resources associated with the received plurality of bids, and the desired telecommunications resources are provided to the one or more recipients if there is a match between the desired telecommunications resources and the telecommunications resources associated with the received plurality of bids.

16. The computer program of claim 1, wherein if a plurality of recipients is determined, an equal amount of the telecommunications resources is distributed to each of the plurality of recipients.

17. The computer program of claim 1, wherein additional telecommunications resources other than the telecommunications resources associated with the plurality of bids are distributed to the one or more recipients.

18. A method, comprising:
   receiving a plurality of bids from a plurality of users, where each of the plurality of bids is associated with telecommunications resources allotted to one of the plurality of users, the plurality of bids including:
      a first bid from a first user, wherein the first bid includes first telecommunications resources allotted to the first user, and
      a second bid from a second user, wherein the second bid includes second telecommunications resources allotted to the second user;
   determining one or more recipients from the plurality of users, including determining that the first user is included in the one or more recipients; and
   in response to determining that the first user is included in the one or more recipients, distributing at least a portion of the telecommunications resources to the first user;
   wherein when the second user is not included in the one or more recipients:
      the second user is prevented from performing one or more actions associated with the second telecommunications resources allotted to the second user and included in the second bid received from the second user, and
      at least a portion of the second telecommunications resources previously allotted to the second user, and included in the second bid received from the second user, is included in the at least a portion of the telecommunications resources distributed to the first user.

19. A system, comprising:
   a processor for:
      receiving a plurality of bids from a plurality of users, where each of the plurality of bids is associated with telecommunications resources allotted to one of the plurality of users, the plurality of bids including:
- a first bid from a first user, wherein the first bid includes first telecommunications resources allotted to the first user, and
- a second bid from a second user, wherein the second bid includes second telecommunications resources allotted to the second user;

determining one or more recipients from the plurality of users, including determining that the first user is included in the one or more recipients; and in response to determining that the first user is included in the one or more recipients, distributing at least a portion of the telecommunications resources to the first user;

wherein the system is operable such that when the second user is not included in the one or more recipients:
- the second user is prevented from performing one or more actions associated with the second telecommunications resources allotted to the second user and included in the second bid received from the second user, and
- at least a portion of the second telecommunications resources previously allotted to the second user, and included in the second bid received from the second user, is included in the at least a portion of the telecommunications resources distributed to the first user.

20. The method of claim 1, wherein by submitting the second bid, the second user agrees that the second telecommunications resources previously purchased by the second user may be blocked from access by the second user at a predefined time, at a predefined date, and for a predefined duration.

* * * * *